United States Patent [19]
Konig et al.

[11] Patent Number: 4,819,301
[45] Date of Patent: Apr. 11, 1989

[54] METHOD AND APPARATUS FOR CONTROLLING THE DRAFTING OF SLIVER IN A DRAWING FRAME

[75] Inventors: Herbert Konig, Ebersbach/Fils; Gerhard Stahle, Adelberg, both of Fed. Rep. of Germany

[73] Assignee: Zinser Textilmaschinen GmbH, Fed. Rep. of Germany

[21] Appl. No.: 69,247

[22] Filed: Jul. 2, 1987

[30] Foreign Application Priority Data

Jul. 4, 1986 [DE] Fed. Rep. of Germany ....... 3622584

[51] Int. Cl.$^4$ .......................... D01H 5/38; D01H 5/42
[52] U.S. Cl. .................................................... 19/240
[58] Field of Search ................... 19/239, 240

[56] References Cited

U.S. PATENT DOCUMENTS

| | | | |
|---|---|---|---|
| 4,199,844 | 4/1980 | Goetzinger | 19/240 |
| 4,369,550 | 1/1983 | Meile | 19/240 |
| 4,506,414 | 3/1985 | Krieger | 19/240 |
| 4,512,061 | 4/1985 | Hartmannsgruber | 19/240 X |
| 4,589,168 | 5/1986 | Krieger | 19/240 |
| 4,653,153 | 3/1987 | Felix et al. | 19/240 |
| 4,703,431 | 10/1987 | Sako et al. | 19/240 X |

Primary Examiner—Louis K. Rimrodt
Attorney, Agent, or Firm—Shefte, Pinckney & Sawyer

[57] ABSTRACT

The present invention relates to a method and an apparatus for controlling the drafing of sliver in a draw frame in which sliver first travels through an advance sensing means that senses variations in the mass, then passes through a drafting means which is located after the advance sensing means and is provided with an adjustable draft, and finally travels through an after sensing means located after the drafting means which senses the mass per unit of length, whereby the draft of the drafting means is varied to compensate for variations in mass of sliver in response to the sensed variations in mass evaluated in a time-delayed manner and of the difference of the measured mass per unit length of the output and of a selectable theoretical value for the mass per unit of length. The sensings are alternately applied to a common control means through switches which predominately apply the advance sensing for control means adjusting of the drafting means and less frequently applying the after sensing to update the control.

11 Claims, 2 Drawing Sheets

METHOD AND APPARATUS FOR CONTROLLING THE DRAFTING OF SLIVER IN A DRAWING FRAME

BACKGROUND OF THE INVENTION

The present invention relates to a method and an apparatus for controlling the drafting of sliver in a draw frame in which sliver first travels through an advance sensing means that senses variations in the mass, then passes through a drafting means which is located after the advance sensing means and is provided with an adjustable draft and finally travels through an after sensing means located after the drafting means and which senses the mass per unit of length, whereby the draft of the drafting means is varied to compensate for variations in mass of sliver in response to the sensed variations in mass evaluated in a time-delayed manner and of the difference of the sensed mass per unit of length and of a selectable theoretical value for the mass per unit of length.

Known prior art is disclosed in German DE-PS 29 12 576. This prior art teaches that the absolute cross section of a sliver is sensed at the outlet of a draw frame and compared with a selected fixed theoretical value, and the relative cross-sectional variations of the sliver are also sensed at a location before the outlet of the draw frame in the direction of sliver travel. The average value of the relative cross-sectional variations is determined over a finite duration of time and compared with the instantaneous cross-sectional variations. A combined signal is formed from the sensed variations which controls regulating means for controlling the drafting means to attempt to draw the sliver to a uniform cross-section.

Additional prior art is disclosed in U.S. Patent Application Ser. No. 057,949, entitled A Method and Means for Controlling the Drafting of Sliver in a Draw Frame filed June 4, 1987, by the same applicants and owned by the same assignee as the present application. This application teaches a method and means for controlling the drafting of sliver in a draw frame in which sliver first travels past a sensing means that sense variations in the mass of sliver and then through a drafting means located after the sensing means. The draft can be changed in order to compensate for variations in mass, wherein a delay time in activation of the drafting means change is provided to account for the travel time of the sliver from the sensing means to the drafting means.

None of the prior art disclose the specific improvement of the present invention wherein a method and means for selecting a theoretical value for the mass per unit of length of sliver is provided, and the difference between this selected theoretical value and the mass sensed by an after drafting sensing means are determined. This difference is then combined with the time-delayed mass variation sensed by an advance sensing means to provide a correcting signal which can be applied to vary the drafting of sliver in response to the correcting signal. The improvements in precision and uniformity of sliver from the apparatus and method of the present invention will thus be readily perceived from the following.

SUMMARY OF THE INVENTION

The present invention is directed to providing a method and apparatus for controlling the draft of sliver in which the drawn sliver is assured to have as uniform a sliver weight per unit of length as possible.

This is accomplished by an improvement in the method of the type initially mentioned in which a theoretical variable is determined from the difference of the sensed mass per unit of length and a selectable theoretical value for the mass per unit of length with the aid of a first control means. From the difference of this theoretical variable and the sensed variation in mass evaluated in a time-delayed manner a correcting variable is determined for controlling the draft of the drafting means with the aid of a second control means.

Since the sensed mass per unit of length is sensed after the drafting means and is a fed-back value in relation to the drafting means, the first control means forms a closed-loop control system which regulates the after sensed mass per unit of length relative to the selectable theoretical value. The second control means is part of a control circuit responsive to input sensing of variation in mass sensed in advance of the drafting means. One input variable of this control is the theoretical value determined from the closed-loop control system. Thus, the closed-loop system is superimposed on the control circuit. This has the consequence that on the one hand the variations in mass of the sliver can be optimally corrected by the control circuit and on the other hand it is assured at each moment, because of the superimposed closed-loop system, that the sliver exhibits the desired mass per unit of length.

In one embodiment of the method of the present invention a commonly used control means is used with switching to first determine the difference between the selected theoretical value of the mass of silver and the mass sensed by the after sensing means. Then switching occurs to next determine a combination by combining the difference with the time-delayed sensed variations sensed by the advance sensing means to provide a correcting signal by which the drafting is varied in response to the correcting signal. The difference between the selected theoretical value and the mass sensed by the after sensing means are applied to the common control means prior to a switching operation to produce a theoretical variable signal. Preferably, the theoretical variable signal is temporarily stored by storage means until switching occurs.

In the preferred embodiment, when a switching operation occurs and the switching means alter to their opposite states, the stored theoretical variable signal is combined to form a combination with the time-delayed sensed variations sensed by the advance sensing means. This combination is applied to the common control means to produce the correcting signal. The correcting signal is temporarily stored until the sliver is in the proper position for adjustment of the drafting. Thus in the preferred embodiment, switching occurs to alternatively apply the difference and combination to the common control means to produce the theoretical variable signal and correcting signal, respectively.

Preferably, the switchings are controlled as a function of running speed of the sliver. This has the effect that, e.g. at an increased sliver running speed, the switching between determination of the difference and determination of the combination or between the control circuit and the closed-loop system are at an increased rate in proportion to the increased sliver speed so that the preciseness of the control method remains constant.

In the preferred embodiment of the present invention, the speed of the traveling sliver is sensed and applied to control the switching frequency in response to the speed of travel of the sliver. Preferably, the switching predominantly connects the combination or control unit to the common control means of the preferred embodiment rather than connecting the difference or closed-loop system to the control means. Thereby, the correcting signal is predominantly provided to control the drafting means while being occasionally updated to adjust for changes in sensing the output.

The apparatus of the present invention provides means for carrying out the foregoing method. Preferably, the apparatus includes means for determining the theoretical variable signal and for determining the correcting variable signal in the form of an electronic digital control device, such as a programmable microprocessor. With a microprocessor it is possible to achieve a higher degree of precision in the control method with fewer component parts being required.

In the preferred embodiment of the apparatus of the present invention, a digital impulse transmitter coupled to the drafting means is provided for sensing the running speed of the sliver and for generating a timing signal. The use of the impulse transmitter, e.g. an increment transmitter, assures in a simple manner the control of the switchings of the switching means as a function of the running speed of the sliver.

A shift register is provided in the preferred embodiment for the time delay of the sensed variations in mass. The use of a shift register, in conjunction with a digital control device, facilitates the generation of the necessary time delay of the sensed variations in mass. The storage capacity of the shift register should be determined as a function of the arrangement of the drafting means and of the sensing means as well as a function of the desired precision of the control method.

Other features and advantages of the invention are apparent from the following detailed description of the preferred embodiments of the present invention and from the accompanying drawings.

DETAILED DESCRIPTION OF THE PREFERRED EMBODIMENTS

Figure 1:
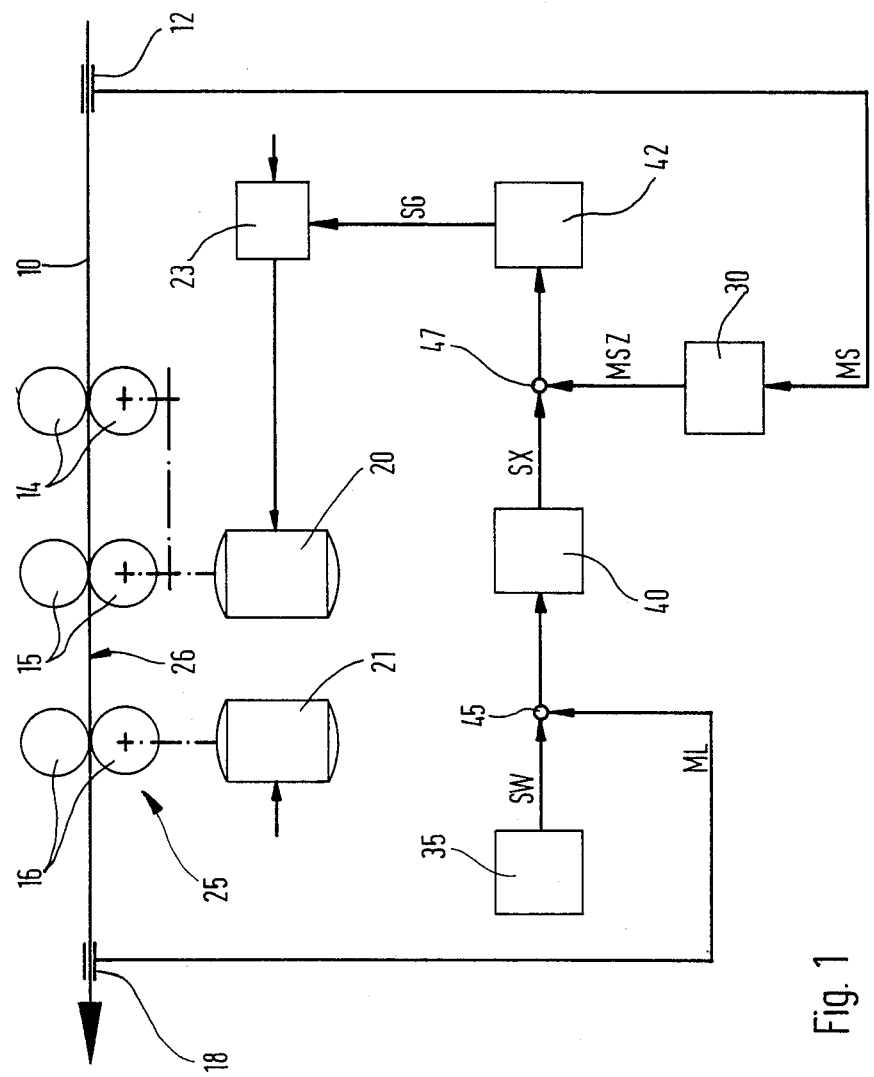
FIG. 1 is a schematic diagram of one embodiment of the present invention.
Figure 2:
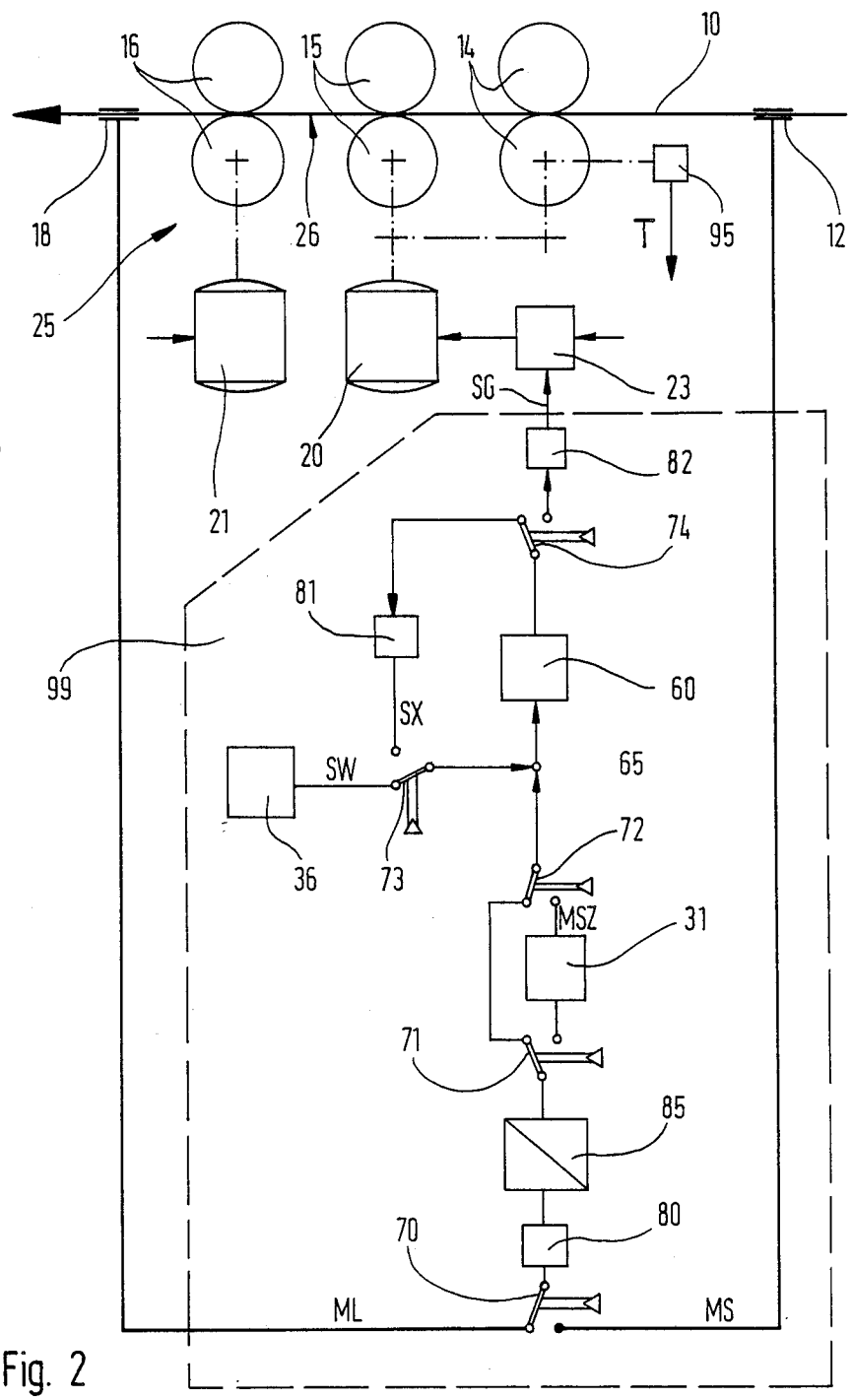
FIG. 2 is a schematic diagram of a second embodiment of the present invention.

FIGS. 1 and 2 show a method and apparatus for controlling the drafting of sliver in a drawing frame in schematic fashion. This control means is used to control the draft to correct for variations in mass of sliver passing through it.

The drafting means of FIGS. 1 and 2 includes essentially an input sensing means 12, three drafting roller pairs 14,15,16 and another sensing means 18 that senses the output. The drafting roller pairs 14,15,16 form a drafting device 25 in a known manner with an adjustable draft. A sliver 10 successively passes through the input sensing means 12, the drafting roller pairs 14,15,16 and the output sensing means 18.

The drafting roller pairs 14,15 are jointly driven by a variable-speed electromotor 20, while drafting roller pair 16 is driven by a fixed-speed electromotor 21. The drafting of sliver 10 is accomplished between the jointly driven drafting roller pairs 14,15 and the other roller pair 16 as a function of the difference of the speeds of the electromotors 20,21 and the ratio of the circumferences of drafting roller pairs 14,15,16.

In order to set its speed, the electromotor 20 is connected to a correcting element 23 which is controlled by at least one input signal, namely, a correcting variable SG.

The input sensing means 12, located in the direction of travel of sliver 10 before the drafting roller pairs 14,15,16, senses the variations in mass of sliver 10 and forms an output signal MS. The output sensing means 18, located after the drafting roller pairs 14,15,16, measures the mass per unit of length of sliver 10 and forms an output signal ML. Both sensing means 12,18 are known, e.g. capacitive primary measuring sensors, and need not be described in more detail herein.

In the draft control means schematically shown in FIGS. 1 and 2 the draft of the drafting device 25 is adjusted so that both the variations in mass of sliver 10 are corrected, and the sliver 10 also exhibits a desired selectable mass per unit of length. As will be explained more fully below, the correcting variable SG, with which the draft of drafting device 25 is adjusted, is determined as a function of the sensed variations in mass MS and the sensed mass per unit of length ML of sliver 10.

A potentiometer or the like is provided as a theoretical value transmitter 35 as illustrated in FIG. 1. With the theoretical value transmitter 35 a user can set the desired theoretical value for mass per unit of length for sliver 10. A theoretical value SW is generated by the transmitter 35 which is connected with the second mass per unit of length ML at a summing point 45 by a subtraction operation the output of summing point 45 by a subtraction operation with the output of summing point 45 being fed to a first control means 40. A theoretical variable SX is generated from this control means 40 as function of the theoretical value SW and the measured mass per unit of length ML according to preset control algorithms.

The variations in mass MS of sliver 10 sensed by the input sensing means 12 are time-delayed with the aid of delay means 30, preferably a delay lead or the like. The output of the delay means 30 are time-delayed variations in mass MSZ. The time delay brought about by the delay means 30 is selected so that the variation in mass sensed at a certain point of sliver 10 is available precisely at the formation of the correcting variable SG when this point of sliver 10 arrives at the drafting point 26 of the drafting means 25. Thus, the delay time, delayed by the variations in mass MS, corresponds to the running time of sliver 10 from the input sensing means 12 to the drafting point 26 of the drafting means 25, which is approximately located between the last two drafting roller pairs 15,16 in the direction of sliver travel.

Time-delayed variations in mass MSZ are connected to the theoretical variable SX at a summing point 47 by a subtraction operation with the output of the summing point 47 being fed to a second control means 42. The second control means 42 generates the correcting variable SG according to set control algorithms as a function of the time-delayed variations in mass MSZ and the theoretical variable SX. With the correcting variable SG the draft of the drafting means 25 can be adjusted.

Since another sensing means 18 is located after the drafting means 25, the first control means 40 belongs to a closed-loop control system. In contrast thereto, the second control means 42 is part of a control circuit continuing the input sensing means 12 located in advance of the drafting means 25 with the variations in mass MS forming a positive input variable. The theoretical variable SX formed by the closed-loop control system influences this input responsive control circuit, such that, the closed-loop control system is superimposed on the control circuit.

If, for example, the theoretical value SW for the desired mass per unit of length of sliver 10 is equal to the sensed mass per unit of length, ML, then the theoretical variable SX formed by the closed-loop control system is equal to zero. This causes the control circuit to adjust the draft of the drafting means 25 in such a manner that the sensed variations in mass MSZ evaluated in a time-delayed manner become zero. If, on the other hand, the theoretical value SW is greater than the sensed mass per unit of length ML of sliver 10, then the closed-loop control system forms a positive theoretical variable SX. This causes the control circuit to adjust the draft of the drafting means 25 in such a manner that the sensed variation in mass MSZ evaluated in a time-delayed manner is not completely compensated but rather a positive variation in mass is striven for. This corrects the deviation of the sensed mass per unit of length from the desired theoretical value. Thus, the theoretical variable SX is always formed by the closed-loop control system in such a manner that the control circuit adjusts the draft of the drafting means 25 not only in response to the correction of variations in mass of sliver 10 being fed to the drafting means, but also corrects in response to non-uniformity of the mass per unit of length of sliver 10 leaving the drafting means.

The control method schematically shown in FIG. 1 and described above can be executed, for example, with the aid of an analog electronic circuit. It is advantageous therefore to perform the entire method, in a continuous manner, that is, to constantly adjust the drafting means 25. However, it is also possible to perform the method in a time-discrete manner, that is, to adjust the drafting means 25 only at certain successive points in time. Such a time-discrete control method is schematically shown in FIG. 2.

In FIG. 2 the output signals MS,ML of the two sensing means 12,18 are fed to a digital electronic microprocessor 99 which supplies the correcting variable SG as an output signal. The correcting variable SG is a function of the variations in mass MS and of the sensed mass per unit of length ML of sliver 10 in the same manner as has already been explained in conjunction with FIG. 1, so that as regards their function, the embodiments of FIGS. 1 and 2 correspond, especially as regards the control circuit and the closed-loop control system.

The embodiment of FIG. 1 is distinguished from the embodiment of FIG. 2 in that only one control means 60 is provided in the embodiment of FIG. 2 which is used jointly by the control circuit and by the closedloop control system. Switches are provided to this end which are shown in FIG. 2 in the form of switching means 70 to 74. Intermediate memories 80,81,82 are provided in the embodiment of FIG. 2 as means to temporarily store the advanced sensed variations in mass MS or after the drawing sensed mass ML, the theoretical variable SX, and the correcting variable SG, respectively. Finally, the microprocessor 99 comprises an analog-to-digital converter 85 which converts the analog signals MS,ML into digital signals.

It is understood that the switching means 70 to 74, the intermediate memories 80,81,82, the control means 60 and the like do not have to be physically present in the microprocessor 99 but rather their function can also be accomplished within a program sequence or the like. Additionally, the variables, e.g. theoretical variable SX, do not have to be physically present in the microprocessor either. These variables can occur both as electrical variables or as binary variables in a program sequence.

The closed-loop control system is activated when the switching means 70 to 74 are in the switch positions shown in FIG. 2. The control circuit is activated when the switching means 70 to 74 are in the opposite switch positions to that shown in FIG. 2. A digital impulse transmitter 95 such as a digital increment transmitter is connected to one of the drafting roller pairs 14 to provide a timing signal T responsive to the speed of travel of the sliver 10. The timing signal T is applied to the switching means 70 and 74 to control the frequency of the switching in response to the speed of travel of the sliver 10. It is also possible to generate timing signal T in a purely time-dependent manner, that is, to perform the switchings according to constant time intervals.

If the closed-loop control circuit is activated, as is shown in FIG. 2, then the sensed mass per unit of length ML is fed to the intermediate memory 80 and temporarily stored by it. After the conversion by the analog-to-digital converter 85, the sensed mass per unit of length ML is connected at a summing point 65 to the selected theoretical value SW representing the desired mass per unit of length of sliver 10 by a subtraction operation to determine the difference between the selected theoretical value SW and mass ML sensed by the other sensing means 18. The difference from the summing point 65 is fed to the jointly used control means 60. The theoretical value SW is generated by a digital theoretical value transmitter 36 which permits a user to select the desired mass per unit of length of sliver 10. The output signal of the control mass 60 is fed to the intermediate memory 81 so that the last theoretical variable SX determined by the closed-loop control system is available at each instant at the output of the intermediate memory 81.

If the control circuit is activated, that is, if the switching means 70 to 74 are in the opposite switching positions from that shown in FIG. 2, then the variations in mass MS are temporarily stored by the intermediate memory 80, converted by the analog-to-digital converter 85, and then fed to a shift register 31 whose storage capacity, as will be explained later, is particularly dependent on the distance from the input sensing means 12 to the drafting position 26 of the drafting device 25. The shift register 31 is controlled by the timing signal T in such a manner that the stored values are "pushed" from register to register in a known time-dependent manner. The sensed variations in mass MS are delayed in time by the shift register 31 so that the sensed time-delayed variations in mass MSZ are available at the output of the shift register 31 at the appropriate time for combination with the theoretical variable SX.

Time-delayed variations in mass MSZ are combined are the summing point 65 with the theoretical variable SX by a subtraction operation. This combination ouput of summing point 65 is fed to the control means 60. The output signal of the control means 60 is fed to an intermediate memory 82 and stored by it. This makes the last correcting variable SG formed by the control circuit available at the output of the intermediate memory 82 at each instant.

As in the embodiment of FIG. 1, the theoretical variable SX determined from the difference between the selected theoretical value SW and the sensed mass ML in the closed-loop control system is also fed in the embodiment of FIG. 2 to the control circuit for combining with the time-delayed variations in mass MSZ in order to generate the correcting variable SG. Thus, the closed-loop control system is superimposed in the same manner on the control circuit. However, the embodiment of FIG. 1 is distinguishable from the embodiment of FIG. 2 in that the theoretical variable SX and the correcting variable SG are not continuously determined but rather are determined in an alternating manner. This is achieved with the aid of the switching means 70 to 74 and the intermediate memories 80 to 82.

If switching means 70 to 74 are operated by timing signal T e.g. every two milliseconds, the running speed of sliver 10 is 480m per minute. If sliver 10 is to be drawn 8 times, then this causes the draft of sliver 10 which passed through drafting means 25 every 2 millimeters (measured length) to be adjusted by the output of correcting element 23.

As in the embodiment of FIG. 1, the time delay created by the shift register 31 in the embodiment of FIG. 2 must correspond to the time of travel of sliver 10 from the advance sensing position 12 to the drafting position 26 of the drafting means 25. To accomplish this, the number of memory cells that the shift register 31 will be required to have should be determined according to the ratio of the distance from the advance sensing means 12 to the drafting position 26 of the drafting means 25 and the measured length of sliver 10, e.g. 2 mm. If the distance from the input sensing means 12 to the drafting position 26 is, e.g. 10 cm, then it follows that 50 memory cells are necessary.

If the timing signal T is generated, as mentioned, by the impulse transmitter 95, then this varies the timing signal T and therewith the frequency of the switching in proportion to the speed of travel of sliver 10. If the timing signal T is generated in this manner and the sliver length of, e.g., 2 mm (measured length) and the number of memory cells of the shift register 31 are constant, then the sliver traveling speed is inconsequential with respect to the sliver length and number of memory cells.

It is possible to control the switching in such a manner that the control circuit is predominately activated and therewith the correcting variable SG is predominately generated. For example, the switching means may be operated to activate the closed-loop control system only once after each hundredth activation of the control circuit. Microprocessor 99 can perform other calculations in the time freed in this manner. It is also possible to use this free time to almost double the number of activations of the control circuit and therewith improve the precision of the controlling method.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance of scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended to or to be construed to limit the present invention or otherwise to exclude any such other embodiments, adaptations, variations, modifications and equivalent arrangements, the present invention being limited only by the claims appended hereto and the equivalents thereof.

We claim:

1. In a method of controlling the drafting of sliver in a draw frame, which method includes sensing variations in mass characteristics of traveling sliver in advance of drawing, said advance sensing including time-delaying variations sensed by said advance sensing in relation to the time of travel of a sliver from the advance sensing to the drafting, sensing the mass of sliver after drawing, and varying drafting in response to said time-delayed advance sensing and to said after sensing, the improvement comprising:
   (a) selecting a theoretical value for mass per unit length of sliver,
   (b) alternately switching between the steps of: (i) determining the difference between the selected theoretical value and the mass sensed by said after sensing, applying said difference to a control means to produce a theoretical variable signal and temporarily storing said signal, and (ii) combining said stored signal with said time-delayed variation and applying the combination to said control means to produce a correcting signal, and
   (c) varying said drafting in response to said correcting signal.

2. In a method according to claim 1 characterized further by sensing the speed of travel of the sliver and applying said sliver speed sensing to said switching to control the frequency of said switching in response to the speed of travel of said sliver.

3. In a method according to claim 1 characterized further in that said switching predominately connects said combination to said control means rather than connecting said difference to said control means, thereby predominately providing said correcting signal.

4. In a method according to claim 1 characterized further by temporarily storing said correcting signal.

5. In an apparatus for controlling the drafting of sliver in a draw frame, which apparatus includes means for sensing variations in mass characteristics of traveling sliver in advance of drafting means, said advancing sensing means including means for time-delaying variations sensed by said advance sensing means in relation to the time of travel of sliver from said advance sensing means to said drafting means, means for sensing the mass of the sliver after drawing, and means for varying drafting in response to said time-delayed sensing by said advance sensing means and said after sensing means, the improvement comprising: means for providing a signal corresponding to a selected theoretical value for mass per unit length of sliver, means for determining the difference between the selected theoretical value signal and the mass sensed by said after sensing means, means for combining a theoretical variable signal representing said difference with the time-delayed variation sensed by said advance sensing means, control means alternately responsive to said difference to produce said theoretical variable signal and to said combination to produce a correcting signal, means for temporarily storing said theoretical variable signal for supply to said combining means, and switching means for alternately supplying said difference and said combination to said control means, said means for varying drafting being responsive to said correcting signal.

6. In an apparatus for controlling drafting according to claim 5 characterized further by a digital impulse transmitter connected to said drafting means to provide a timing signal responsive to the speed of travel of said sliver, said switching means being operable in response to said timing signal.

7. In an apparatus for controlling drafting according to any of claim 5 or 6 characterized further by a programmable microprocessor that incorporates said control means.

8. In an apparatus for controlling drafting according to either claim 5 or 6 characterized further by a programmable microprocessor that incorporates said control means, said microprocessor including shift register means for providing said time delay.

9. In an apparatus for controlling drafting according to claim 5 characterized further by a programmable microprocessor that incorporates said control means, said means for temporarily storing said theoretical variable signal being digital storage means incorporated in said microprocessor, and said means for temporarily storing said correcting signal being digital storage means incorporated in said microprocessor.

10. In an apparatus for controlling drafting according to either claim 5 characterized further by a programmable microprocessor that incorporates said control means, said microprocessor including an analog-to-digital converter for converting the sensings of said advance and after sensing means.

11. In an apparatus for controlling drafting according to claim 5 characterized further by means for temporarily storing said correcting signal.

* * * * *